United States Patent [19]
Wardle

[11] Patent Number: 5,679,905
[45] Date of Patent: Oct. 21, 1997

[54] FLUID FLOW MEASUREMENT

[75] Inventor: David Grant Wardle, Tadworth, England

[73] Assignee: The BOC Group plc, Windlesham, England

[21] Appl. No.: 672,208

[22] Filed: Jun. 27, 1996

Related U.S. Application Data

[63] Continuation of Ser. No. 386,835, Feb. 10, 1995, abandoned.

[30] Foreign Application Priority Data

Feb. 14, 1994 [GB] United Kingdom ............... 9402768

[51] Int. Cl.⁶ .................................................. G01F 1/74
[52] U.S. Cl. ................................. 73/861.04; 73/200
[58] Field of Search ........................... 73/200, 196, 198, 73/861.04, 861.42, 861.77

[56] References Cited

U.S. PATENT DOCUMENTS

| | | |
|---|---|---|
| 4,429,581 | 2/1984 | Furmaga ........................... 73/200 |
| 4,760,742 | 8/1988 | Hatton . |
| 4,773,257 | 9/1988 | Aslesen et al. . |
| 4,881,412 | 11/1989 | Northedge ........................ 73/200 |
| 4,951,700 | 8/1990 | Kálmán . |
| 5,048,348 | 9/1991 | Durrett et al. ................... 73/200 |
| 5,212,990 | 5/1993 | Stout et al. . |

FOREIGN PATENT DOCUMENTS

| | | |
|---|---|---|
| 2 610 105 | 1/1987 | France . |
| 1208121 | 10/1970 | United Kingdom . |
| 2089049 | 6/1982 | United Kingdom . |
| 2152213 | 7/1985 | United Kingdom . |
| 2163558 | 2/1986 | United Kingdom . |
| 2180352 | 3/1987 | United Kingdom . |
| 2201795 | 9/1988 | United Kingdom . |

Primary Examiner—George M. Dombroske
Assistant Examiner—Max H. Noori
Attorney, Agent, or Firm—R. Hain Swope; Roger M. Rathbun

[57] ABSTRACT

A fluid measuring device for measuring fluid present in liquid and vapor phase having a phase separator 12, a device for measuring the flow of the liquid and optionally the vapor and a device for recombining the liquid and vapor phases after the flow rates are measured.

20 Claims, 1 Drawing Sheet

FLUID FLOW MEASUREMENT

This application is the continuation of application Ser. No. 08/386,835 filed Feb. 10, 1995 which is now abandoned.

TECHNICAL FIELD

The present invention relates to fluid flow measurement and relates particularly, but not exclusively, to the measurement of fluids present in two phases.

BACKGROUND OF THE INVENTION

One of the problems associated with measuring the flow of cryogenic liquids, such as for example liquid nitrogen, is that it is very difficult to maintain the fluid in a single phase. Liquid nitrogen boils at $-196°$ C. and hence, unless very complex and expensive refrigeration apparatus is used, the liquid tends to boil off when being passed along a transportation pipe. The boil off creates a two phase flow of liquid and vapor. When both liquid and vapor are present, standard flow measurement methods such as measuring the pressure drop across a calibrated orifice are inaccurate.

It would therefore be a significant advance in the art of fluid flow measurement if an accurate method can be developed for measuring the flow of a fluid when present in two phases.

SUMMARY OF THE INVENTION

The present invention provides an apparatus for measuring fluid flow of a fluid present in both liquid and vapor form, the apparatus comprising; separation means, for separating the fluid into liquid and vapor phases; measuring means for measuring at least the flow rate of the liquid phase; and, recombining means for recombining the liquid and the vapor phases prior to the use thereof.

The separation means preferably comprises a material having a multiplicity of passages therethrough, as, or example a volume of metal wool and the like.

The measuring means preferably comprises a collector vessel having a V shaped outlet for allowing liquid collected therein to drain therefrom under steady flow conditions, at the same rate as it enters the collector vessel while creating a change in liquid level therein indicative of the change in flow through the collector vessel. Means may also be provided for determining the depth of the liquid in the collector vessel to determine the flow rate therethrough.

Alternatively, the measuring means may comprise a paddle wheel or turbine propeller driven by the flow of liquid, and means for determining the speed of rotation of said wheel so as to determine the flow rate of the liquid.

The apparatus may further include an integrating device for integrating the measurements of the depth of the liquid in the collector vessel so as to determine the flow rate therethrough. An averaging means may be provided for averaging a number of depth measurements, to provide a more convenient indication of the volume of fluid passed.

The apparatus may further include means for measuring the flow of vapor, said means comprising means of measuring the pressure drop across the separation means to obtain a measure of the vapor passing therethrough.

By measuring both the liquid and vapor flow it will be possible to determine the LN QUALITY i.e.

$$\frac{GAS}{LN} = (e.g.\ 60\%\ LN).$$

In a preferred embodiment of the invention, the apparatus comprises a sealed housing having a generally horizontally extending portion into which the two phase flow is introduced and in which the separation means (e.g. a phase separator) is situated, and a generally vertically extending portion extending downwardly from the generally horizontal portion having the liquid flow measuring means and said recombining means situated therein.

Conveniently, the recombining means comprises a material having a multiplicity of passages therethrough, such as for example, a volume of metal wool and the like. Means may also be provided for reducing the velocity of any fluid entering the apparatus.

BRIEF DESCRIPTION OF THE DRAWINGS

The following drawings are illustrative of embodiments of the invention and are not intended to limit the invention as encompassed by the claims forming part of the application.

DETAILED DESCRIPTION OF THE INVENTION

Figure 1:
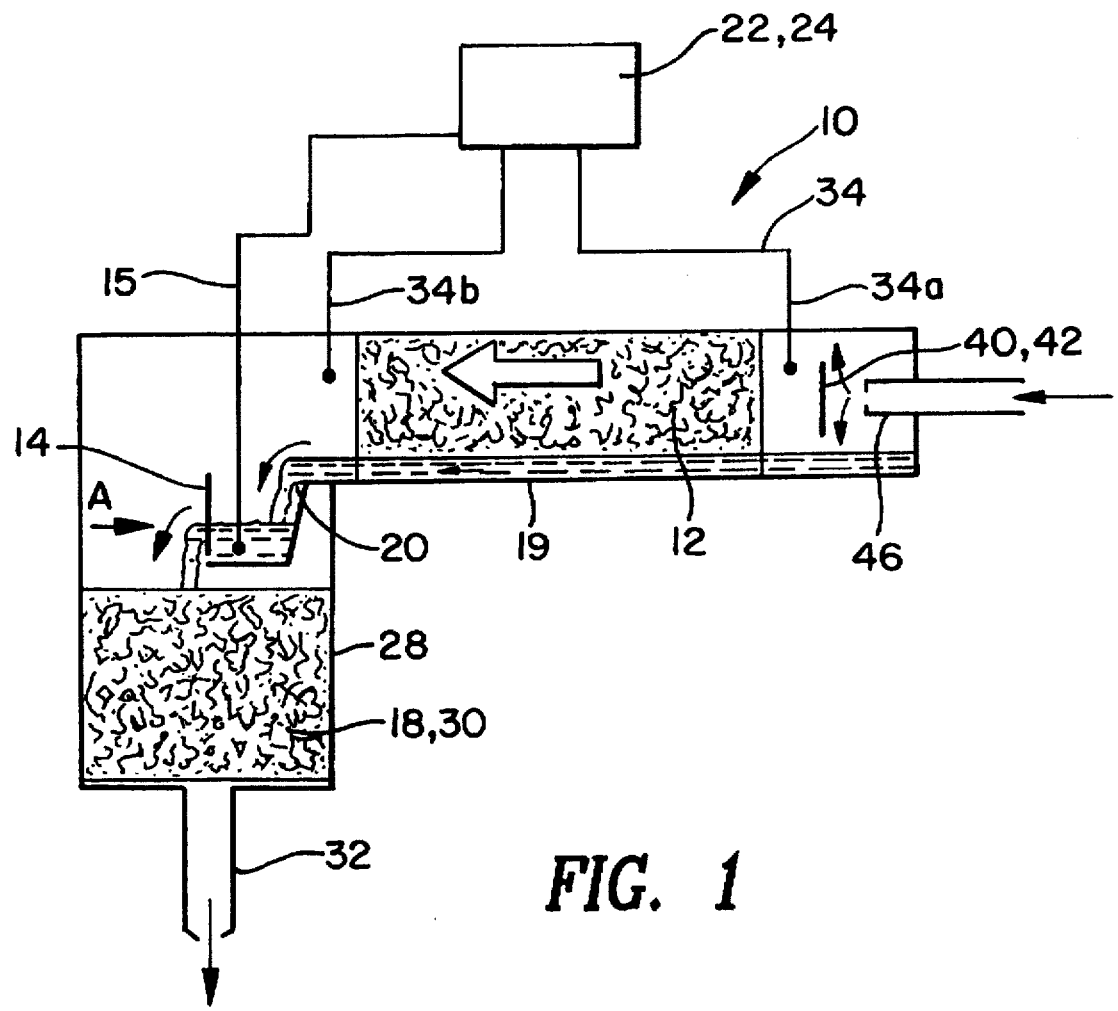
FIG. 1 is a cross sectional view of a flow measuring apparatus according to the present invention.

Referring now to the drawings in general but particularly to FIG. 1, the apparatus 10 comprises a sealed housing 11 including a separation portion 12, for separating the fluid into the liquid and vapor phases; a measuring apparatus 14 and a recombining region 18. The separation portion 12 comprises a generally horizontally extending tube 19 of, for example, 125 mm (5 inch) diameter. The tube is provided with a material having a multiplicity of passages therethrough, such as, for example metal wool, which acts to split the fluid into liquid and vapor phases, the liquid flowing along the bottom of the tube while the vapor rises above the tube and travels along the upper portion of the tube. Stainless steel wool having a metal to space ratio of 3/7 has been found to be particularly useful.

Figure 2:
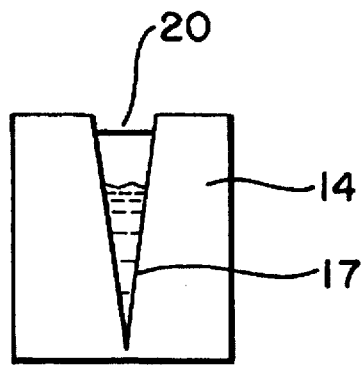
FIG. 2 is an enlarged front view of the measuring device shown in FIG. 1.

Towards the end of the separation portion 12, a weir 20 acts to allow the liquid phase to fall towards a measuring device 14. In the embodiment shown in FIGS. 1 and 2 the measuring device 14 comprises a collector vessel 21 having a V-shaped outlet 17 (see FIG. 2) in its side. The outlet allows liquid collected in the collector vessel 21 from the tube 19 to drain therefrom under steady flow conditions, at the same rate as the liquid enters the collector vessel, while changes in the level of liquid in the collector vessel 21 are created which are indicative of changes of the flow rate of the liquid through the collector vessel.

Means for determining the depth of the liquid in the collector vessel is provided. The depth of the liquid may be determined by, for example, a capacitance depth probe 15 which may generate a signal corresponding to the depth of the liquid. An integrating device, shown by the reference numeral 22 may be provided for integrating the output signal from the depth probe 15 to determine the volume of fluid passing through the collector vessel 21. The output signal from the depth probe 15 may be averaged over a period of time by averaging means 24, operatively connected to the integrating device 22.

Figure 3:
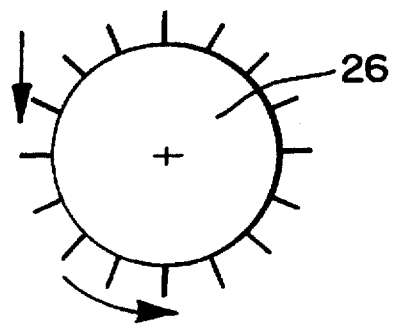
FIG. 3 is another embodiment of the liquid flow measuring device.

In an alternative arrangement, the liquid flow measurement device 14 may comprise a paddle wheel or turbine propeller 26 as shown in FIG. 3. In this embodiment of the invention, the liquid is directed over the wheel or propeller 26 in a manner which results in the turning thereof. The speed of rotation of the wheel 26 is directly proportional to the liquid flow rate. Means (not shown) may be provided for generating an electrical output from the wheel or propeller 26 and passing the electrical output to the averaging means 24 of the integrating device 22, if desired.

In either arrangement, separated liquid which has passed through the measuring means 14, is recombined with the vapor flow in a generally vertically downwardly extending portion 28 of the pipe 19. Portion 28 is provided with a recombining means 30 such as, for example, a volume of steel wool. It will, however, be appreciated that any other material having a multiplicity of passages passing therethrough may be used. Recombined fluid is directed by a pipe 32 from the bottom of the pipe portion 28 towards an apparatus (not shown) in which it is to be consumed.

The flow of vapor through the apparatus 10 of the present invention may be measured by providing a pressure sensor 34a, 34b at either end of the phase separator 12 and measuring the pressure drop. The output of the pressure sensor 34 may be converted to an electronic signal and directed to the averaging means 24 if desired.

Means in the form of, for example, a baffle plate 40 or a nozzle which directs any incoming fluid tangentially relative to inlet 46 may be provided for reducing the velocity of the incoming fluid. The reduced velocity fluid is more easily separated and reduces the quantity of vapor present.

In operation, fluid flows into the inlet 46 and is separated into liquid and vapor phases by separator 12, each of which are then directed past separate measuring means 14, and 34, respectively before being recombined and passed to the outlet pipe 32. The outputs from the respective measuring means may be used to determine the individual or combined flows. Additionally, it will be possible to determine the quality of the combined fluid, that is to say the ratio of vapor to liquid.

Such measured values will be useful in the control of the apparatus (not shown) to which the recombined fluid is directed. In a chilling apparatus in which liquid nitrogen is sprayed over food items passing therethrough so as to freeze said items, the flow rate of a fluid having a high concentration of vapor might be increased so as to ensure sufficient liquid is available for chilling. Liquid nitrogen being more efficient at chilling than gaseous nitrogen.

I claim:

1. Apparatus for measuring the flow rate of a two-phase cryogenic fluid within a closed refrigeration system comprising:
    a) a housing having a substantially horizontally extending first portion for receiving the two, phase cryogenic fluid and a substantially vertically extending second portion in fluid communication with the first portion for receiving the two-phase cryogenic fluid as separate liquid and vapor streams;
    b) said horizontally extending first portion comprising separation means for separating the two-phase cryogenic fluid into an upper vapor stream and a lower liquid stream at a pressure, a conduit for collecting the liquid stream and for delivering the liquid stream under gravity to the vertically extending second portion without a substantial change in said pressure;
    c) measuring means within said vertically extending second portion for measuring the flow rate of at least the liquid stream; and
    d) recombining means for recombining the liquid and vapor streams without a substantial change in said pressure and for returning the recombined liquid and vapor streams to the closed refrigeration system.

2. The apparatus of claim 1 wherein the separation means comprises a material having a multiplicity of passages therethrough.

3. The apparatus of claim 2 wherein the separation means comprises metal wool.

4. The apparatus of claim 1 wherein the measuring means is a liquid measuring means comprising a collector vessel having a V-shaped outlet for allowing liquid collected therein to drain therefrom under steady flow conditions at the same rate as the liquid enters the collector vessel while creating a change in the level of liquid corresponding to a change in the flow rate of the liquid through the collector, and depth measuring means for determining the depth of liquid in the collector vessel to thereby determine the flow rate therethrough.

5. The apparatus of claim 4 further comprising a device for receiving measurements of the depth of the liquid from the depth measuring means and for integrating the measurements so as to determine the flow rate of the liquid therethrough.

6. The apparatus of claim 5 further comprising averaging means for averaging the depth measurements to obtain an average flow rate over a given period of time.

7. The apparatus of claim 1 wherein the measuring means comprises a paddle wheel or propeller operatively placed in the flow of the liquid to cause rotation of the wheel or propeller and means for determining the speed of rotation of said wheel or propeller so as to determine the flow rate of the liquid.

8. The apparatus of claim 1 wherein the measuring means comprises means for measuring the flow of vapor, said vapor flow measuring means comprising means for measuring the pressure drop across the vapor phase in the separation means to thereby obtain a measure of the vapor passing therethrough.

9. The apparatus of claim 1 wherein the recombining means comprises a material having a multiplicity of passages therethrough.

10. The apparatus of claim 9 wherein the recombining means comprises metal wool.

11. The apparatus of claim 1 further comprising means for reducing the velocity of the fluid.

12. A method of measuring the flow rate of a two-phase cryogenic fluid within a closed refrigeration system comprising:
    passing the two-phase cryogenic fluid into a housing having a substantially horizontally extending first portion, separating the two-phase cryogenic fluid within the first portion of the housing into separate lower liquid and upper vapor streams at a pressure; collecting the liquid stream in a conduit, passing the liquid and vapor streams into a substantially vertically extending second portion of the housing which is in flow communication with the first portion of the housing to thereby cause the flow of the liquid and vapor streams to change direction under gravity from a substantially horizontal direction in the first portion to a substantially vertical direction in the second portion without a substantial change in the pressure; measuring the flow rate of at least the liquid stream, recombining the liquid and vapor streams within the second portion of the housing without a substantial change in the pressure, and returning the combined liquid and vapor streams to the closed refrigeration system.

13. The method of claim 12 comprising passing the two-phase cryogenic fluid through a material having a multiplicity of passages to thereby separate the two-phase cryogenic fluid into separate liquid and vapor streams.

14. The method of claim 12 comprising collecting the liquid in a collector vessel having a V-shaped outlet, allowing the liquid collected therein to drain therefrom under steady flow conditions at the same rate as the liquid enters the collector vessel while creating a change in the level of liquid corresponding to a change in the flow rate of the liquid through the collector, and measuring the depth of liquid in the collector vessel to thereby determine the flow rate therethrough.

15. The method of claim 14 further comprising receiving measurements of the depth of the liquid and integrating the measurements so as to determine the flow rate of the liquid therethrough.

16. The method of claim 15 further comprising averaging the depth measurements to obtain an average flow rate over a given period of time.

17. The method of claim 12 comprising measuring the pressure drop across the vapor stream to thereby obtain a measure of the vapor flow.

18. The method of claim 12 comprising passing the liquid and vapor streams through a multiplicity of passages to thereby recombine said liquid and vapor streams.

19. The method of claim 18 comprising passing the liquid and vapor streams through metal wool.

20. The Method of claim 12 further comprising reducing the velocity of the cryogenic fluid.

* * * * *